Patented Apr. 10, 1934

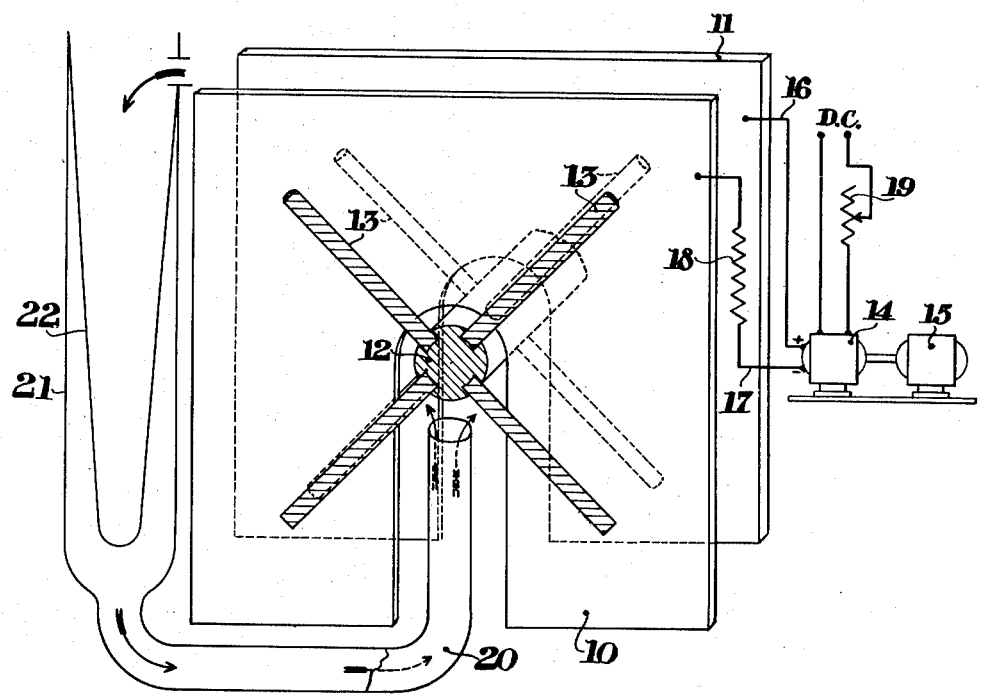

1,954,316

UNITED STATES PATENT OFFICE 1,954,316

METHOD FOR THE RECOVERY OF SILVER FROM USED PHOTOGRAPHIC FIXING SOLUTIONS BY ELECTROLYSIS

Kenneth C. D. Hickman and Walter J. Weyerts, Rochester, N. Y., assignors to Eastman Kodak Company, Rochester, N. Y., a corporation of New York Application May 28, 1931, Serial No. 540,622

14 Claims. (Cl. 204—16)

The present invention relates to a method for recovering silver from used photographic fixing solutions and more particularly to a method of recovering silver from such solutions by electrolysis.

The recovery of silver from spent fixing baths is practised by most film laboratories and the procedure is well known. The sulfide precipitation process remains the general favorite because, in spite of messiness and the uncertain control of the refining charges the requirements in skill and labor are low.

The amount of labor, or research to economize labor, which a process will carry is not a fixed quantity but increases with the growth of the operating unit. Processing laboratories have advanced to such a size that it would be profitable to install elaborate recovery systems, even at the cost of higher labor charges and skilled supervision, if increased yields were available. In the search for a suitable process it has been considered essential to find ways of using the fixing bath more than once, preferably in a continuous flow cycle.

The primary object of the present invention is the provision of a practical method for recovering silver from a used photographic fixing bath by electrolysis.

Another object of the present invention is the provision of a method for so recovering silver from a fixing solution that the solution may be further used for photographic fixing.

A further object of the invention is the provision of an electrolytic silver recovery method that is made practical by violent mechanical agitation, sweeping or swirling of the electrolyte between electrodes and especially over the surface of the cathode.

Still another object of the invention is the provision of an electrolytic silver recovery method that permits increase in current density with increase in silver concentration of the solution without affecting the deposit of silver.

A still further object of the invention is the provision of an electrolytic silver recovery method that is adaptable to a variation of the speed at which the solution moves across the cathode to permit corresponding variations in the current density.

Another object of the invention is the provision of an electrolytic silver recovery method that includes mechanical agitation of the solution to create a centrifuging action therein to aid in circulating said solution during purifying or filtering thereof.

A further object of the invention is the provision of an electrolytic silver recovery method that includes mechanical agitation of the solution to promote the deposition of silver and to prevent the formation of silver sulphide at the cathode.

Other objects of the invention will be suggested, to those skilled in the electro-chemical arts and especially to those familiar with the previous impractical attempts to recover silver electrolytically from used photographic fixing baths, as the description of our electrolytic silver recovery method is set forth hereinafter.

The above and other objects of our invention are embodied in a method of silver recovery from fixing solutions by electrolysis including mechanical agitation of the solution between the electrodes and utilization of said agitation for circulating the solution during filtering thereof.

In the accompanying drawings:

Figure 3 is a fragmentary representation of an apparatus for practising the electrolytic silver recovery method of the invention.

Figure 1:
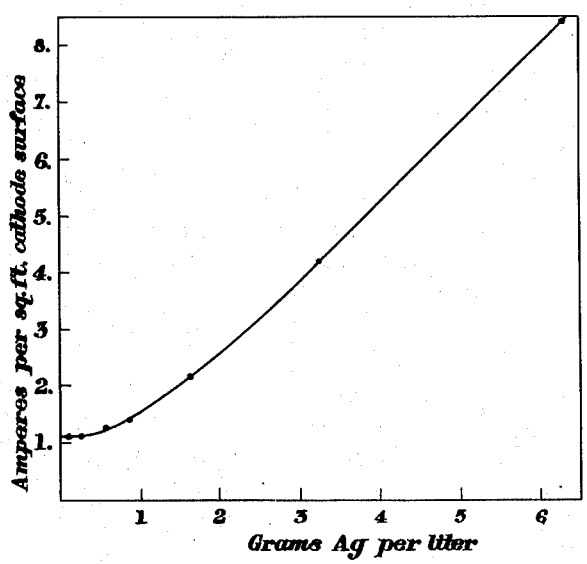
Figure 1 is a diagram having a curve representing the ratio of permissible current density to silver content with a flow of solution past the cathode at one foot per second.

When an electric current is passed between two uncorrosible electrodes immersed in a water solution of a metallic salt, oxygen gas is generally evolved at the anode or positive pole, and metal is deposited at the negative cathode. The metal may be powdery, crystalline, dull, or bright, loose or adherent according to the conditions. Silver deposited from silver nitrate or other simple salts is loosely attached to the electrode in a granular or micro-crystalline state. Bright, adherent deposits are obtained from the double cyanide of silver and potassium, and from certain ammoniacal solutions.

When a current of usual plating density is passed through thiosulfate solutions containing silver no oxygen is liberated at the anode, and a black cloud of silver sulfide is liberated at the cathode which soon obscures the solution. If the current is diminished a hundred fold to less than 50 milliamperes per square foot, silver is very slowly deposited in adherent metallic form. Although such slow deposition is useless commercially it shows that the plating reaction is fundamentally possible and it suggests that deposition at higher current densities is spoiled by side reactions.

The electrolytic separation of a metal from a simple salt occurs in the following stages:

On dissolving in water the salt ionizes into two components oppositely charged electrically.

Thus $$AgNO_3 \rightleftharpoons Ag^+ + (NO_3)^-$$

When an electric current is passed the positive silver ion moves to the negative pole, gives up its charge and deposits in the form of metallic silver on the pole piece. The nitrate ion $NO_3^-$ moves to the positive pole and, at the moment of liberation, decomposes water with the formation of nitric acid and oxygen:

$$4NO_3^- + 4^+ + 2H \cdot OH \rightarrow 4HNO_3 + O_2$$

The separation of metal from potassium cyanide or silver thiosulfate occurs differently. The salts yield ions thus:

$$NaAg(CN)_2 \rightleftharpoons Na^+ + Ag(CN)_2^-$$

$$NaAgS_2O_3 \rightleftharpoons Na^+ + AgS_2O_3^-$$

It should be noted that the silver is now in the negatively charged particle or anion and is driven away from the cathode pole toward the anode. On discharge at the latter, part of the cyanide ions and all the thiosulfate ions are oxidized and the silver remains in the solution. The sodium ions or cations discharged as metallic sodium atoms at the cathode are so reactive that they decompose any ions in their vicinity yielding silver if there remain enough $AgS_2O_3^-$ ions, otherwise they reduce water to hydrogen, or reduce thiosulfate to a series of compounds, most of them fatal to good silver plating.

It is not proposed to detail the very complex chemistry of the electrolyses more than to stress that the silver deposited from a used fixing bath is secondary silver liberated from complex silver particles which are all wandering away from the only place where they can deposit. It is the problem of the recovery chemist to see that in spite of the migration there are always enough silver ions in the neighborhood of the cathode to react with the electric charge or with sodium atoms, otherwise the hypo will be attacked, yielding among other things, sodium sulfide, which will in turn precipitate some silver sulfide. It will be revealed presently how even a little silver sulfide can spoil a growing silver surface.

Figure 2:
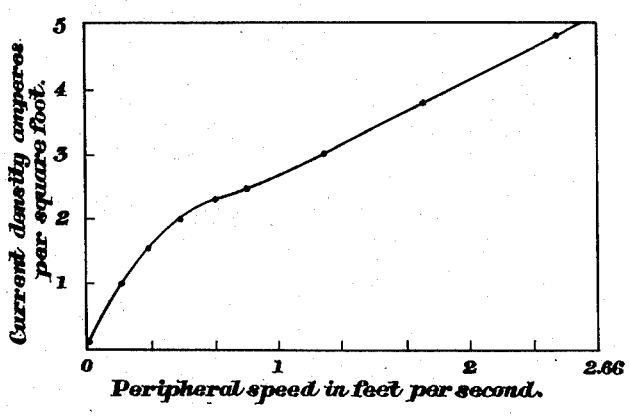
Figure 2 is a diagram having a curve which represents the ratio of permissible current density in amperes per square foot of cathode surface to the peripheral speed of solution across the cathode in feet per second.

The obvious way to counteract migration is by using a bath rich in silver and by vigorous stirring which renews solution in the neighborhood of the electrodes. The ratio of permissible current to silver content is shown in Figure 1. The quantity of current that the cathode can tolerate increases enormously with agitation, and with really violent stirring the current density can be increased hundreds of times without generating sulfide. The increase of permissible current with increase of surface velocity is shown in Figure 2. Rates of flow above four ft. per second, or below one foot per second have not proved economical.

Consider now a certain element of cathode surface having a suitable current density by which a stream of correctly adjusted, well agitated electrolyte is passing at a velocity sufficient to give metallic plating. Suppose there are present particles of dirt, sulfide precipitate, or what not. Some of the particles will be electrically neutral, some will be positively charged and some negatively. Of these some of the positively charged particles will deposit on the cathode. Again, of those that adhere some will conduct current and some will not. The conducting particles project into the stream and are in such a position for preferential plating that they will become sheathed in silver forming a substantial nodule. Those parts of the electrode surface which are surrounded by nodules are now so sheltered from the agitation that the critical limit is passed and silver sulfide is generated. The sulfide particles are washed into the main stream and are in turn attracted to new places on the cathode where they generate other silver nodules. Thus, in a short time a small amount of solid impurity will have poisoned a large area of electrode. After agitation, therefore, the next problem is filtration, before and during electrolysis.

Even with the most carefully purified silver thiosulfate solutions the silver surface becomes poisoned before it is very thick. This is because the silver deposits, in crystalline form, many minute individual crystals growing next to one another over the surface. The individuals are not all presenting the same crystal faces to the solution—some offer fast growing surfaces, others slow. There results a matted deposit which soon harbors crevices in which the fatal stagnation can occur, sulfide is liberated, and the surface becomes dull and powdery.

Crystalline deposition has long been the enemy of the practical plater and in the effort to combat the trouble he has accumulated a list of "doctors" and addition agents which, added in relatively small quantities, greatly diminish granularity. Of the well known "doctors," glue, gum arabic, tannin, carbon bisulfide, fluorides, silicates, etc., glue and gelatin are the most powerful. Photographic hypo contains a little true gelatin and always much degraded gelatin having the properties of glue. The fixing bath thus contains its own "doctor".

It should be explained that gelatin is an "amphoteric" colloid whose particles can behave in solution as though positively or negatively electrified according to the acidity or alkalinity prevailing. In an acid fixing bath the gelatin "ion" moves to the cathode and is deposited with the silver, the properties and appearance of which it modifies profoundly. When the solution holds traces of gelatin the deposit is firm and adherent and varies from a creamy white matte surface to a pure white burnished surface of extreme brilliancy. As the gelatin products are increased the deposit becomes bluish-white with a brilliant specular reflection. Analysis reveals 99 to 96 per cent silver and 1 to 4 per cent gelatin and water. The mechanical strength is poor and the contraction on drying is often sufficient to strip the metal from the cathode. Further increases in gelatin yield dark blue or black deposits largely contaminated with sulfide and when this happens the fixing or hypo solution becomes badly discolored.

A guess at the underlying causes of these changes is helpful. It is supposed that a small addition of gelatin allows a thin layer of relatively large spongy gelatin molecules (micellæ) to adhere evenly over the initial deposit of silver. The layer is thin enough to repress the faster growing crystal faces and to force the next layer of silver to deposit uniformly. Probably the idea of alternating layers of silver and gelatin is merely a useful fiction, the true reaction being an indiscriminate absorption of gelatin with the silver which prevents the development of any but the most isolated fragments of crystal lattice. When the gelatin content is high the adsorbed layer is so thick that it imprisons a volume of hypo solution from which the silver thiosulfate ions are being depleted by migrating, and the evil condition of substantially no agitation is produced.

In motion picture practice the gelatin in the fixing bath varies all the way from a just sufficient quantity for good plating to a serious overload and it becomes imperative to learn to control plating whatever the condition of the bath.

The search for a gelatin antidote or plating "activator" brought to light a very interesting series of compounds, disclosed in our co-pending application, Serial No. 401,610 filed October 22, 1929, and issued May 10, 1932, as Patent No. 1,857,507, any member of which will neutralize the effect of excess gelatin and further improve the plating with moderate gelatin content. Our aforementioned co-pending application also discloses the basic feature of the present invention to the effect that plating of silver from thiosulphate solutions is greatly favored by vigorous stirring of the solutions or electrolytes.

Several methods of vigorously stirring the electrolyte were considered, namely, (1) by air, (2) by external pumps, (3) by rotating the cathodes or anodes, and (4) by mechanically agitating the solution between the anode and cathode.

Of these alternatives air stirring is by far the most attractive, and at least one commercial unit is operating successfully by this means. For the present experiments air stirring was found inefficient, the lack of efficiency being laid to two causes. First, the silver is deposited by a secondary reaction, in which the silver thiosulfate complex is reduced by nascent sodium or hydrogen. When the cathode is wiped by a continuous stream of air bubbles, part of the reducing material is oxidized by the air and the current efficiency falls off seriously. Second, that space between anode and cathode which should be occupied by electrolyte is diluted with bubbles so that at any moment only part of the plating area is effective.

The difficulty of using external pumps is that used photographic fixing solutions containing silver are one of the most corrosive solutions known for common metals. Stirring paddles, bearings, and pipe lines should be constructed from special alloys or hard rubber, and it is scarcely more trouble to incorporate these materials in an internal stirrer than in separate pumps.

The rotating cathode is objectionable because the shaft must be dismantled for stripping the silver. The rotating anode is good except that heavy electric currents have to be conveyed through slip rings to the shaft, and thence by good connections to the anodes, which are conveniently of carbon or graphitic materials which do not lend themselves to good contact. Rotating electrodes tend to move in a smooth slip stream and the true agitation at the cathode surface is poor. Mechanical agitating means such as a stirrer revolving between the electrodes not only swings the solution but, since it occupies volume, it disturbs the diffusion strata as it passes each element of the plates. Mechanical agitating means is adopted in the present design.

The construction of the plating cell is described in detail in our co-pending application Serial No. 540,621 filed on even date herewith for improvements in Apparatus for electroplating silver from used photographic fixing solutions, and is indicated briefly in Figure 3 of the drawings.

A plurality of cathodes 10 and anodes 11 are placed in spaced relation within a suitable casing (not shown) in a known manner. The cathodes 10 and anodes 11 are provided with inverted U-shaped slots to straddle the mechanical agitating means comprising a shaft 12 which has a plurality of sets of arms 13 axially spaced along shaft 12. Each set of arms comprises four arms 13 in quadrature on the shaft and is located between each cathode 10 and anode 11 as indicated in dotted lines in Figure 3 of the drawings.

The mechanical agitating means is rotated by any suitable prime mover (not shown) and may be rotated at various speeds preferably such that the speed of the solution across the cathodes 10 and anodes 11 may be varied from one to four feet per second.

The electrical energy to the electrodes is provided by a direct current generator 14 driven by a suitable prime mover 15. The generator 14 has the positive side thereof connected to anode 11 by a wire 16 while the negative side of generator 14 is attached to the cathode 10 by a wire 17 through a resistance 18. The resistance 18 may be interchanged if variation of the voltage across the electrodes is desired.

The current density of the electrodes may be controlled by regulating the excitation of generator 14 by means of a field rheostat 19. As indicated by the curves of Figures 1 and 2 the permissible current density varies directly with the silver concentration of the fixing solution and with the peripheral speed thereof with respect to the electrodes.

Movement of the electrolyte between the electrodes is not the only useful purpose to which the mechanical agitating of electrolyte is put. The rotation of arms 13 about shaft 12 creates a centrifuging action in the electrolyte and an area of reduced pressure in the neighborhood of the shaft 12. This reduced pressure causes electrolyte to be sucked from a stand-pipe 20, one of which is located at each cathode. The stand pipe 20 is connected to the bottom of a filter cell 21 which contains a filter bag 22. An outlet 23 permits solution to overflow from the spaces between the electrodes into filter cell 21 and filter bag 22.

The circulation of solution during filtering by virtue of the centrifuging action in the solution is accomplished in the following manner. Solution is sucked through the stand pipes 20 into the area of reduced pressure within the plating cell until the liquid level in the filter cell 21 has fallen to a degree which balances the suction. Solution overflows from between the electrodes through outlets 23 near the top of the plating cell into the filter bag 22 from whence it is returned to the plating cell by way of stand pipes 20.

With a stirring speed of 80 R. P. M. and an acid hypo bath of approximately the following initial composition:

| | Parts |
|---|---|
| Hypo | 300 |
| Sodium sulfite | 10 |
| Acetic acid (or the equivalent) | 10 |
| Chrome alum | 10 |
| Silver (metal) | 4 |
| Gelatin, developer sludge, etc., amount equiv. 200 ft. of film per gallon. | |
| Water | 1000 | a current of 200–250 amperes may be employed to reduce the silver content to 1 part per 1000. This will reclaim hypo from about 10,000 feet of positive film per hour.

Baths containing much silver and sulfite and acid have yielded deposits which when dried in an oven gave the following analyses:

| | Per cent |
|---|---|
| Silver | 99.7 |
| Chromium | .1 |
| Gelatin and water | .2 |
| Other metals | A trace |

From baths rich in chrome alum and developer residues which have been contaminated by passing through much piping and metal tanks, the following is a typical analysis of silver secured at 300 amperes per cell.

| | Per cent |
|---|---|
| Silver | 94.3 |
| Gelatine and water | 4.1 |
| Copper | .3 |
| Chromium and iron | 1.0 |
| Ash | .3 |

Of these constituents, the silver is freed of all but the copper by simple ignition in the presence of air. Refining charges, in the usual sense, need not be contemplated. The copper can be removed at source by careful attention to the pipe and tank layout in the processing laboratory.

Fixing solution passing through the plating cells does not change in appearance except to become entirely free from suspended matter, and the progress of electrolysis can be controlled only by analysis. Since the fixing power is diminished directly with the increases in silver and since the maximum permissible plating current varies in the same manner, it becomes vitally necessary to have reliable analytical information available at all times. Rather than leave this to human agency it has been decided to make the analysis and current control entirely automatic. The apparatus devised for the purpose is described in the co-pending application of K. C. D. Hickman Serial No. 540,620 filed on even date herewith and issued March 7, 1933, as Patent No. 1,900,893 for improvements in Automatic silver removing control.

Since many modifications of our invention are possible, the present disclosure is to be construed in an illustrative sense limited only by the scope of the appended claims.

Having now particularly described our invention, what we claim and desire to secure by Letters Patent of the United States is:

1. The method of electrolyzing a used photographic fixing solution containing silver which comprises impressing an electrical potential across an anode and a cathode in said solution, said anode being of a substance other than silver, and mechanically agitating said fixing solution to move the same over the surface of the cathode whereby silver is deposited on said cathode without precipitation or deposition of silver sulphide.

2. The method of electrolyzing a used photographic fixing solution containing silver which comprises impressing an electrical potential across an anode and a cathode in said solution, said anode being of a substance other than silver, and mechanically sweeping said fixing solution across the surface of the cathode whereby silver-containing ions are kept distributed over the surface of said cathode to promote deposition of silver thereon and to prevent the formation of silver sulphide.

3. The method of electrolyzing a used photographic fixing solution containing complex silver ions, which comprises impressing an electrical potential across an anode and a cathode in said solution, said anode being of a substance other than silver, and mechanically swirling said fixing solution across the surface of the cathode to distribute said complex silver ions over said cathode.

4. The method of electrolyzing a used photographic fixing solution containing complex silver ions, which comprises impressing an electrical potential across an anode and a cathode in said solution, said anode being of a substance other than silver, to initiate a migration of said silver ions to the anode and mechanically swirling said fixing solution across the surface of the cathode and distributing said silver ions over said cathode in spite of their tendency to migrate therefrom.

5. The method of electrolyzing a used photographic fixing solution containing complex silver ions, which comprises impressing an electrical potential across a carbon anode and a stainless steel cathode in said solution and mechanically swirling said fixing solution across the surface of the cathode and distributing said silver ions over said cathode.

6. The method of electrolyzing a used photographic fixing solution containing sodium and hydrogen cat-ions and complex silver an-ions which comprises impressing an electrical potential across an anode and a cathode in said solution, liberating nascent sodium and hydrogen at the cathode, mechanically sweeping said fixing solution across the surface of the cathode and reducing the complex silver cat-ions with the nascent sodium and hydrogen to deposit metallic silver on said cathode.

7. The method of electrolyzing a used photographic fixing solution containing sodium and hydrogen cat-ions and complex silver an-ions, which comprises impressing an electrical potential across an anode and a cathode in said solution, liberating nascent sodium and hydrogen at the cathode, mechanically sweeping said fixing solution across the surface of the cathode and reducing the complex silver cat-ions with the nascent sodium and hydrogen without oxidation by air to deposit metallic silver on said cathode.

8. The method of electrolyzing a used photographic fixing solution containing silver which comprises impressing an electrical potential across an anode and a cathode in said solution, mechanically sweeping said fixing solution across the surface of the cathode and creating a centrifuging action therein, and filtering said solution while circulating under said centrifuging action whereby the impurities such as traces of silver sulphide are removed from the solution.

9. The method of electrolyzing a used photographic fixing solution containing silver which comprises impressing, across an anode and a cathode in said solution, an electrical potential adapted to be varied and to alter the current density of said cathode and mechanically sweeping said fixing solution over the surface of the cathode at speeds varying directly with the current density of the cathode.

10. The method of electrolyzing a used photographic fixing solution containing silver which comprises impressing, across an anode and a cathode in said solution, an electrical potential adapted to be varied to alter the current density of said cathode in direct proportion to the silver concentration of said solution and mechanically sweeping said fixing solution over the surface of the cathode.

11. The method of electrolyzing a used photographic fixing solution containing silver which comprises impressing, across an anode and a cathode in said solution, an electrical potential adapted to be varied to alter the current density of said cathode directly with the silver concentration of said solution and mechanically sweeping said fixing solution over the surface of the cathode at speeds varying directly with the existing current density of the cathode.

12. The method of electrolyzing a used photographic fixing solution containing silver which comprises impressing, across an anode and a cathode in said solution, an electrical potential adapted to be varied and to alter the current density of said cathode in direct proportion to the silver concentration of the solution and mechanically sweeping said fixing solution over the surface of the cathode at speeds varying directly with the silver concentration of the used photographic fixing solution.

13. The method of electrolyzing a used photographic fixing solution containing silver which comprises impressing an electrical potential across an anode and a cathode in said solution and mechanically sweeping said fixing solution in a circular path over the surfaces of the anodes and cathodes in the same direction.

14. The method of electrolyzing a used photographic fixing solution containing silver which comprises impressing an electrical potential across an anode and a cathode in said solution and mechanically sweeping said fixing solution in a circular path over the surfaces of the anodes and cathodes at a substantially constant angular velocity.

KENNETH C. D. HICKMAN.
WALTER J. WEYERTS.